United States Patent [19]

Gerardin

[11] Patent Number: 4,928,152
[45] Date of Patent: May 22, 1990

[54] PROCESS AND DEVICE FOR OPTICALLY MEASURING THE DISTANCE AND THE VELOCITY OF A TARGET

[75] Inventor: Jean-Pierre Gerardin, Nanterre, France

[73] Assignee: Electricite De France, Paris, France

[21] Appl. No.: 17,646

[22] Filed: Feb. 24, 1987

[30] Foreign Application Priority Data

Feb. 24, 1986 [FR] France ................. 86 02515

[51] Int. Cl.⁵ .................... G01C 3/08; G01P 3/36
[52] U.S. Cl. .......................... 356/5; 356/28.5
[58] Field of Search ..................... 356/5, 28.5

[56] References Cited

U.S. PATENT DOCUMENTS 3,733,129 5/1973 Bridges.
3,811,774 5/1974 Honeycutt et al.
3,825,340 7/1974 Debart.
4,611,912 9/1986 Falk et al. .................. 356/5

FOREIGN PATENT DOCUMENTS 0118342 12/1984 European Pat. Off.
601289 5/1948 United Kingdom.

OTHER PUBLICATIONS

Patents Abstracts of Japan, vol. 9, No. 1-9, (P-380) (1922)m 16 aout 1985; & JP-A-60 64 284 (Matsushita Denki Sangyo K.K. (12-04-1985 *Resume*.
L'Onde Electrique, vol. 51, No, 5, Mai 1971, pp. 406-410, Paris, FR; J. P. Landrot: "Radioaltimetre a Modulation de Frequence", *En entier*.

Primary Examiner—Stephen C. Buczinski
Attorney, Agent, or Firm—Sughrue, Mion, Zinn, Macpeak & Seas

[57] ABSTRACT

A device for optically measuring the distance of a target (20) comprising a monomode coherent light source (18) means (18a, 21, 30) for periodically varying the wavelength of the light of the source, a photodetector (19) for detecting the variation in the wavelength between the light from the source (18) and that retroradiated by the target (20), and means (23, 24, 25; 33, 34, 35; 41, 43, 46) for processing the output signal of the photodetector (19) corresponding to the composite optical signal issuing from the cavity of the source of light and resulting from the re-injection into this cavity of the light retroradiated by the target (20), the frequency of the output signal of the photodetector being representative of the distance between the source (18) and the target (20).

10 Claims, 7 Drawing Sheets

PROCESS AND DEVICE FOR OPTICALLY MEASURING THE DISTANCE AND THE VELOCITY OF A TARGET

The present invention relates to optical telemetry devices and more particularly to optical telemetry devices capable of measuring distances on the order of a few centimetres to a few metres.

The field of application of such devices resides in the dimensional measurements in places difficult of access, such as steam generators, or in the apprehension of the environment for robot systems, and in particular for mobile intervention robots.

Among known telemeasuring devices used at the present time for such applications, there may be mentioned the ultrasonic telemeters whose main drawback resides in their wide field angle and their sensitivity to parasite echoes which prevent effecting measurements in an encumbered environment such as a bunch of tubes, grids or the like.

Triangulation optical telemeters are also known which require, in order to be precise, a large base which also constitutes an obstacle for measurements in an encumbered region.

Further, the system involving the superposition of the beams for forming the sides of the triangle is optically complex.

Flight time optical telemeters are also known with which there is measured the time elapsed between the transmission and the reception of a light pulse. Bearing in mind the speed of light, the resolution of these devices is low (on the order of several tens of centimetres) and, owing to this, the measurement of short distances is rendered difficult. Moreover, the object must generally be cooperative in that it must be retroreflective.

Optical telemeters measuring phase shifts measure the phase lag between the modulation of the transmitted light and that received as an echo.

The difficulty of the measurement resides in the fact that, in order to obtain good precision at short distances, a very fine modulation must be effected. Moreover, as in the case of flight time optical telemeters, the target must be the most often cooperative.

An object of the invention is to overcome the drawbacks of optical telemeasuring devices by providing a device having a narrow field capable of permitting measurements on a very fine axis which does not require a target specially equipped to render it cooperative and which employs simple electronic operating means.

The invention therefore provides a process for optically measuring the distance between a target and a given point, comprising sending toward the target a radiation having a periodically varying wavelength from a monomode coherent light source supplied with a signal of variable power placed at said point, receiving the radiation retroradiated by the target, re-injecting said radiation into the cavity of the light source and receiving on a photodetector placed at the rear of the source the beat between said retroradiated radiation and the radiation from said source, the frequency of the beat which is proportional to the delay of the retroradiated wave being representative of the distance between said source and said target.

The invention also provides a device for optically measuring the distance of a target and carrying out the process defined hereinbefore, said device comprising a monomode coherent light source, means for periodically varying the wavelength of the light of said source, a photodetector for detecting the variation in the wavelength between the light from said source and that retroradiated by said target, and means for processing the output signal of said photodetector corresponding to the composite optical signal issuing from said cavity and resulting from the re-injection into said cavity of the light retroradiated by said target, the frequency of the output signal of said photodetector being representative of the distance between said source and said target.

A better understanding of the invention will be had from the following description which is given solely by way of example with reference to the accompanying drawings, in which.

The vibrometers are generally constructed in accordance with the diagram of operation of Michelson's interferometer which comprises a laser whose light radiation is transmitted by a measuring channel including two semi-reflecting mirrors and a collimating optic, toward a target.

A part of the light emitted by the laser is reflected by a first semi-reflecting mirror and modulated in a modulator so as to be applied, with the light reflected by the target, by means of a second semi-reflecting mirror, to a light detector.

The photodetector effects the comparison of the frequency of the light issuing from the laser and passing through the reference path constituted by the first semi-reflecting mirror, the. modulator and the second semi-reflecting mirror, with the frequency of the light reflected by the target by a mixing of the two beams on its sensitive surface.

The frequency of the signal received is proportional to the velocity of displacement of the target.

In order to obtain information concerning the direction of displacement of the target, the two beams must vary from each other in frequency.

In the absence of relative movement between the target and the laser, this frequency variation is detected which increases or decreases as the target moves away or toward the detector.

Among the various means for achieving this variation, there may be mentioned the rotating networks and the acoustooptical modulators.

None is truly easy to employ. Moreover, the optical assembly occupies a relatively large amount of space.

Figure 1:
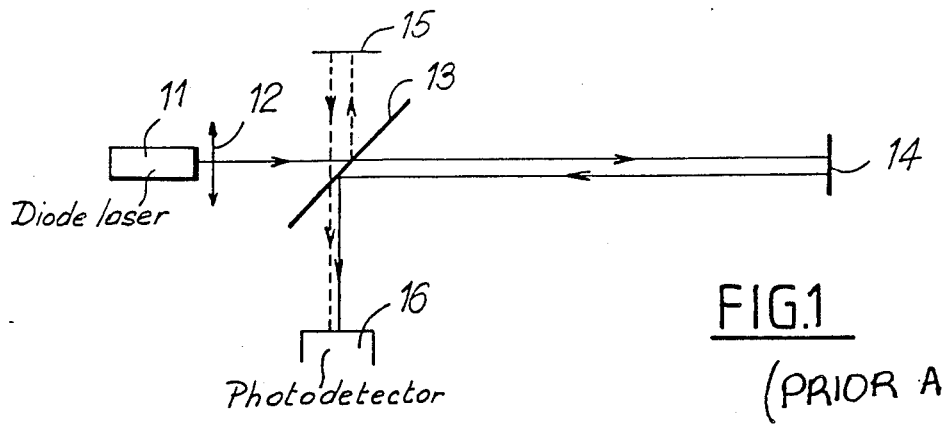
FIG. 1 is a schematic of a conventional laser diode of a vibrometer.

The diode laser vibrometer shown in FIG. 1 comprises a diode laser 11 at the output of which is placed a collimating optic 12. A semi-reflecting mirror 13 is disposed between the optic 12 and a mirror 14 constituting a target.

Another mirror 15 is placed to be perpendicular to the path of the light reflected by the semi-reflecting mirror 13 so as to reflect in turn the light it receives toward a photodetector 16 which also receives the light reflected by the mirror 14 and directed toward the photodetector by the semi-reflecting mirror 13.

In the case of the use of a diode laser, the frequency variation may be achieved by continuously varying the emission frequency, i.e. the wavelength of the light emitted by the diode laser.

Owing to the difference between the paths followed by the measuring beam which strikes the mirror 14 and the reference beam which is reflected by the mirror 15, the beams which are mixed on the photodetector 16 have been emitted at different moments and are therefore of different frequencies.

In the diode lasers, the frequency of the emitted light is highly dependent on the electric field applied to the semiconductor which is part thereof.

The variation in the emission frequency may consequently be obtained simply by varying the control current and consequently the power of emission of the diode 11.

By way of example, in the case of a diode laser of particular type having a power of 3 mW, a variation in the current resulting in a variation in the power on the order of a milliwatt, results in a variation in the frequency of about 5 GHz (0.1 A or 0.01 namometre in wavelength.

As a first approximation, the variation in the light frequency is proportional to the variation in the control current.

To obtain a linear scanning of the frequency of the light signals emitted by the diode laser, current ramps are used.

After mixing in the photodetector between the reference light signal and the light signal reflected by the target, the received signal is at a frequency proportional to the scanning velocity of the light frequency, to the difference between the measuring and reference paths, and to the velocity of displacement of the target in the direction of the measuring beam.

Figure 2:
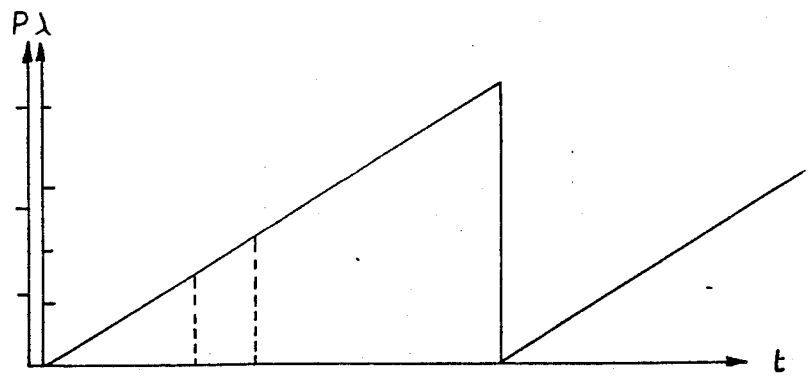
FIG. 2 is a diagram as a function of time of the transmitted wave length of the laser diode of the vibrometer of FIG. 1.

The diagram of FIG. 2 represents the curve of the power in the form of a ramp applied to the diode laser and the corresponding variation in the wavelengths emitted by the latter.

If there are considered the wavelengths $\lambda_1$ and $\lambda_2$ emitted by the diode laser at instants $t_1$ and $t_2$, the time interval is the difference between the path times in each channel.

Figure 3:
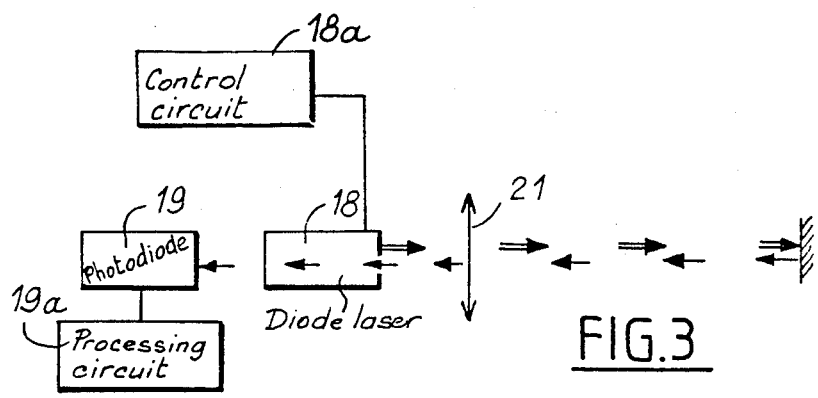
FIG. 3 is a schematic of a preferred embodiment of a laser diode telemeter according to the invention.

A simplified embodiment of the diode laser vibrometer is shown in FIG. 3.

A photodiode is associated with certain diode lasers and disposed on the rear side of the crystal of the diode laser.

The photodiode is initially intended to control the emission power of the diode laser.

The circuit shown in FIG. 3 uses such an association between a diode laser and a photodiode.

It comprises a diode laser 18 provided with a p-i-n photodiode 19. Connected to the diode laser 18 is a control circuit 18a while a processing circuit 19a is connected to the p-i-n photodiode 19. The control and processing circuits will be described in more detail hereinafter.

Interposed in the optical path between the target 20 and the diode laser 18 is a collimating optic 21.

The diode laser used is for example of the type CQL 16 RTC of 3 mW which has the advantage of including a collimation optical system producing a beam which is very slightly divergent (0.3 mrd) with a wavelength at the limit of being visible ($\lambda = 780$ nm).

The determination of the form, the amplitude and the frequency of the control current slopes of the diode laser is carried out in the following manner.

Knowing that the frequency of the Doppler signal 2 $V/\lambda$ is on the order of 2.5 MHz per m/s, there must be, in order to measure velocities of a few decimeters/second, an initial frequency offset of 1 to 2 MHz.

The forward and return path time of the light between the diode laser and a target placed at 15 cm from the diode laser is $10^{-9}$ s.

To obtain a frequency offset of 1 MHz, the frequency of the light must vary by $10^6/10^{-9}$ Hz/s.

The wavelength of the laser varies by 5 GHz per mW. By modulating the power by 2 mW, there is obtained a frequency offset on the order of 10 GHz.

As a slope of $10^{15}$ Hz/s is required, this power variation must be effected in $$10^{10} Hz / 10^{15} Hz/s = 10^{-5} s$$

which corresponds to ramps of 2 mW at 100 KHz.

Each control signal ramp must therefore be constituted by around 10 alternations of the signal at 1 MHz, which must be sufficient to reveal the frequency fluctuations due to the Doppler effect on the target.

It will be noted that it is possible to increase this frequency by moving away the target.

Figure 4:
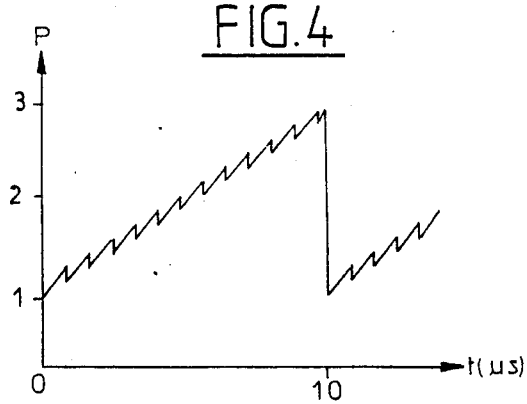
FIG. 4 is a diagram, as a function of time, of the signal from the control photodiode of the telemeter of FIG. 3.

In FIG. 4, there has been shown the shape of the signal issuing from the control photodiode 19.

As mentioned above, this ramp signal has a frequency of 100 KHz and is modulated by a signal of 1 MHz.

Figure 5:
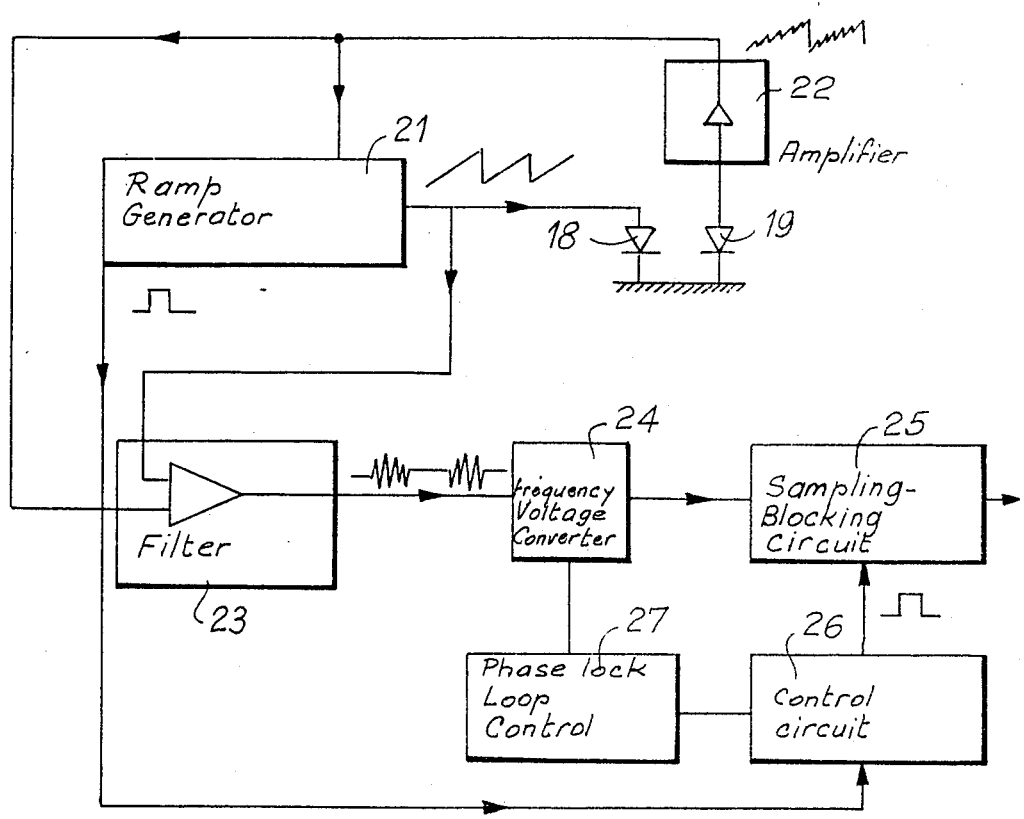
FIG. 5 is a block diagram of a circuit for controlling and processing signals of a vibrometer carrying out the invention.

The modulation of the ramp signal for controlling the diode laser is effected by the control circuit 18a of FIG. 3 shown in detail in FIG. 5.

This circuit mainly comprises a ramp generator 21 whose output is connected to the diode laser 18.

This same output of the ramp generator 21 is connected to a first input of a filter 23 whose second input is connected to the output of the amplifier 22 which is connected to the control photodiode 19. The output of the filter 23 is connected to a frequency-voltage converter 24 having a phase locking loop. The output of the frequency voltage converter is connected to a sampling-blocking circuit 25 whose control input is connected to the output of a control circuit 26 with which there is associated a circuit 27 controlling the phase locking loop.

The ramp generator 21 has another output connected to an input controlling the control circuit 26.

This circuit operates in the following manner:

Under the control of the ramp generator 21, the diode laser 18 emits a radiation of variable frequency.

The control photodiode 19 receives the signal reflected by the target 20 (FIG. 3) and delivers a ramp current modulated by the variation of frequency between the signal emitted by the diode laser and the signal received from the target 20.

This modulated signal after amplification by the amplifier 22 is applied, on one hand, to the ramp generator 21 as a stabilization signal for the point of operation of the diode laser and, on the other hand, to the filter 23 which also receives the ramp signal on its other input in phase opposition with the modulated signal.

The filter delivers signal trains at the frequency of modulation of the control photodiode by the light reflected by the target which has travelled through, in its return path, the cavity of the diode laser 18. These signals are converted into voltage by the frequency-voltage converter 24, and sampled by the sampling-blocking circuit 25 which delivers at its output a signal representative of the velocity of the target.

The control circuit 26 produces the storage of the output voltage in the course of the last two microseconds preceding the negative transient of each current ramp in the course of which the signals are not used. For this, it receives a synchronization signal of the ramp generator 21.

The circuit shown in FIG. 5 is capable of measuring the velocities of the vibrations of the target of a few tens of centimetres per second at distances between the target and the diode laser of between 20 cm and 2 m.

The sampling frequency of the output signal at 100 KHz is not troublesome since it is much greater than the frequency ranges usually met with in the mechanical field.

Figure 6:
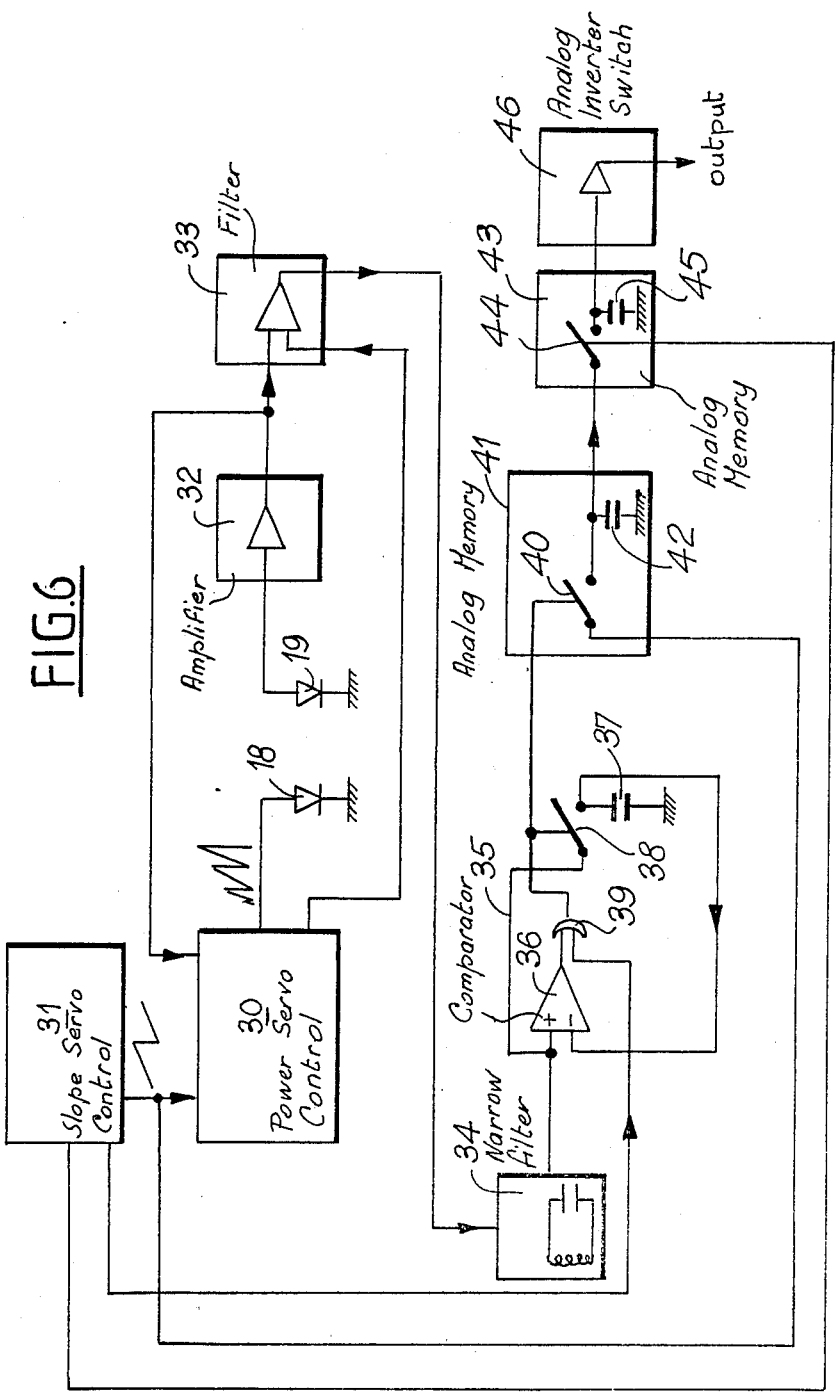
FIG. 6 is a complete block diagram of the control and processing circuit of a telemeter according to the invention.

The circuit shown in FIG. 6 is an embodiment of the device according to the invention which may be used in telemetry.

The measurements of the distances less than a few metres present delicate problems for conventional telemeters.

These apparatus operate either by a measurement of the flight time of a pulse or by a measurement of the phase difference angle of an amplitude modulation applied to the emission The very short time (a few nanoseconds) between the emission and the reception randers the measurement at short distances very difficult.

It has been established in respect of the description of the device in FIGS. 3 to 5, that for a power ramp of 2 mW of a duration of 10 μs, a signal of 1 MHz is obtained on a target placed at 15 cm from the diode laser.

The frequency of this signal is a function of the travelling time of the light and increases linearly with the distance between the target and the laser.

A simple spectral analysis is sufficient to give a good approximation of the measurement.

To achieve a measurement of distance, it is proposed to vary the slope of the power ramps applied to the diode laser and to recover the signal delivered by the control diode following on the reception of the light reflected by the target through a filter tuned to a fixed frequency.

It is then sufficient to note the value of the slope at the moment of the maximum response of the filter to deduce therefrom the distance to be measured.

The circuit shown in FIG. 6 comprises a power servo-control 30 of the diode laser 18 at the input of which is connected a slope servo-control 31. The control photodiode 19 is connected through an amplifier 32 to an input of a filter 33 whose other input is connected to the servo-control 30. The output of the amplifier 32 is moreover connected to a synchronization input of the servo-control 30.

The output of the filter 33 is connected to the input of a narrow filter 34 tuned to a fixed frequency and having its output connected to a voltage maximum search circuit 35.

The circuit 35 comprises a comparator 36 whose positive input is connected to the output of the narrow filter 34 and whose negative input is connected to an analog memory constituted by a capacitor 37 whose terminal opposed to the terminal connected to the comparator 36 is connected to the ground. A swtich 38 is connected between said terminal of the capacitor 37 connected to the negative input of the comparator 36 and the positive input of the latter.

. The output of the comparator 36 is connected to an input of an OR gate 39 whose other input is connected to an output of the slope control 31.

The output of the OR gate 39 controls the switch 38 and a switch 40 of a second analog memory 41 comprising a capacitor 42 storing the value of the slope. The switch 40 is connected between the output of the slope control 31 connected to the servo-control 30 and the terminal of the capacitor 42 opposed to the ground.

The output of the second analog memory 40 is connected to a third analog memory 43 constituted by a switch 44 controlled by the slope control and a capacitor 45 connected betwen the switch 44 and the ground.

The output of the analog memory 43 is connected to an analog inverter switch 46 whose output constitutes the output of the circuit.

The operation of the circuit shown in FIG. 7 will be described with reference to FIGS. 7a to 7d.

Figure 7A:
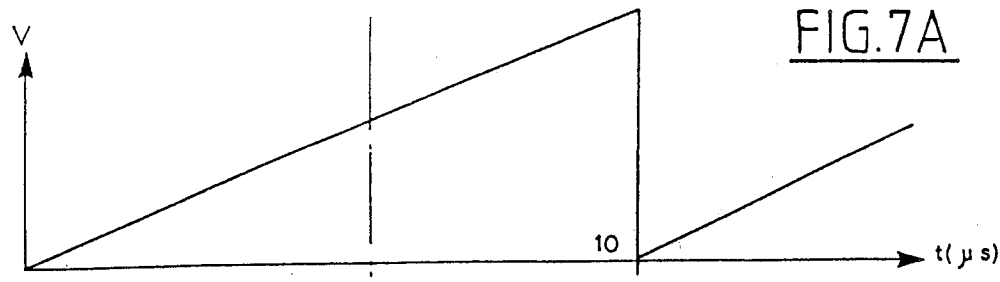
FIGS. 7a to 7d are diagrams of signals appearing at various points of the circuit of FIG. 6.
Figure 7B:
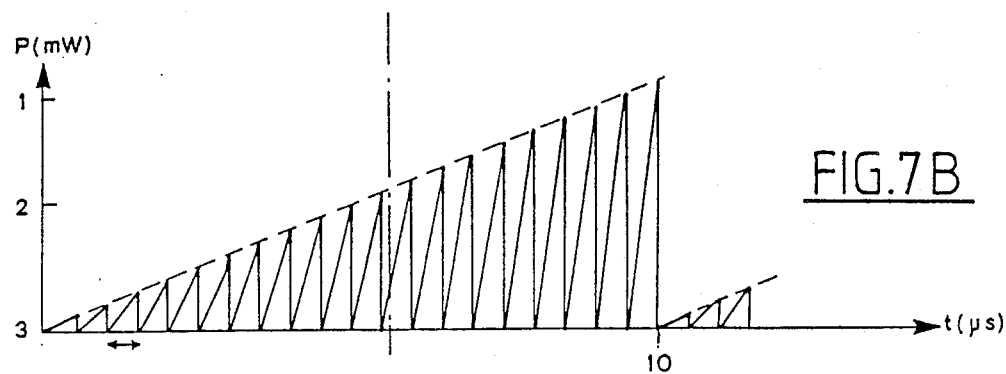

The diode laser 18 supplied with current by a power modulated ramp signal whose form is shown in FIG. 7b and which comes from the power servo-control 30 which receives a slope control signal shown in FIG. 7a from the slope control 31. It emits a light whose frequency is proportional to the supply current.

The light reflected by the target and returning into the diode laser 18 and its control photodiode 19 causes, as in the case of the circuit shown in FIG. 5, the photodiode 19 to emit a ramp signal modulated by a signal corresponding to the frequency difference between the emitted light and the received light.

After amplification in the amplifier 32, this signal is filtered in the filter 33 by combination of the signal cocming from the photodiode 19 with the ramp signal of the servo-control circuit 30.

Figure 7C:
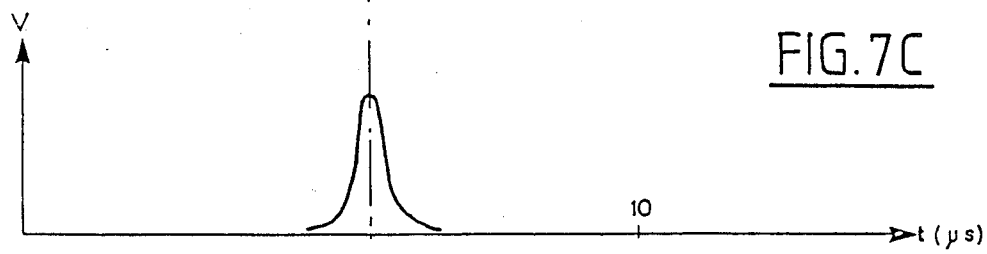
Figure 7D:
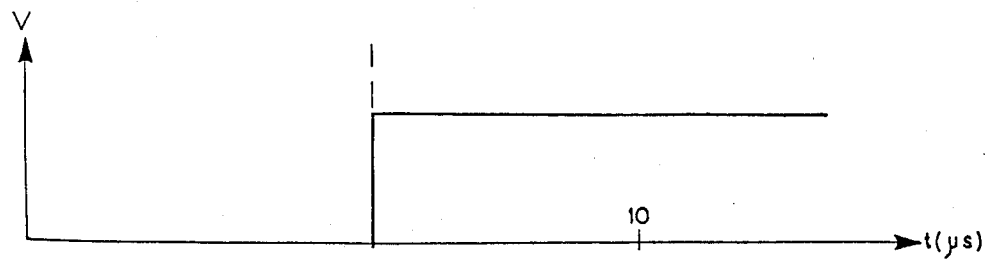

The output signal of the filter 33 is applied to the narrow band filter 34 which delivers an output pulse when the slope of the ramps corresponds to the distance between the source 18, 19 and the target 20 (FIG. 7c). This signal is applied to the circuit 35 searching the voltage maximum which also receives the slope control signal.

The voltage maximum is stored in the capacitor 37 and compared in the comparator 36 with the following voltage maximum. At the end of each ramp, the slope corresponding to the voltage maximum is stored in the memory 41. The value of the greatest response giving the distance between the target and the source at the end of each ramp is transferred to the memory 43.

The signal issuing from the storage of the slope control voltage at the moment of the maximum response of the filter 34 has an evolution which is the inverse of the distance between the urce and the target.

The analog inverter 46 delivers at its output a voltage proportional to the measured distance.

The power ramp generator 30 is controlled by a sawtooth signal of 100 Hz. The duration of these ramps remains constantly fixed at 10 μs. The modulation depth will be all the more greater as the slope increases. It is preferable to generate ramps of decreasing power so as to have available the maximum power of the laser for the small slopes corresponding to the distances of larger measurements.

Figure 8:
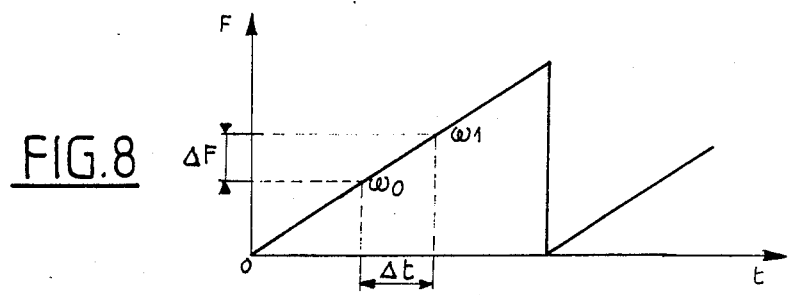
FIG. 8 is a diagram, as a function of time, of the variation in the frequency of the signal received after retrodiffusion by the target.

When the device according to the invention operates as a telemeter, the frequency of the signal received on the photodiode 19 is proportional to the slope of the frequency variations of the signal emitted by the diode laser at the measured distance and at the relative velocity between the target and the diode laser. The form of this signal is shown in FIG. 8.

The mixing on the photodetector of the light emitted at instant $t_1$ with that emitted at instant $t_0$ is given by the equation:

$$I = \cos \omega_{1t} \cos \omega_t$$

If the frequency $\omega_0$ had been modified by the Doppler effect resulting from the movement of the target, the expression $\cos \omega_{0t}$ becomes $\cos (\omega_0 + \omega_d)t$ so that the preceding equation is written:

$$I = \cos \omega_{1t} \cos (\omega_0 + \omega_d)t$$
$$= \cos (\omega_{1t} + \omega_0 + \omega_d)t + \cos (\omega_1 - \omega_0 - \omega_d)t.$$

The term $\cos (\omega_1 + \omega_0 + \omega_d)t$ is at a frequency which is too high ($10^{15}$ MHz) to be transmitted by the photodiode.

The frequency of the signal received will therefore be of the form $\cos (\omega_1 - \omega_0 \omega_d)t$ in which $\omega_1 - \omega_0$ represents the evolution of the frequency of the source between the instant of the emission of the light by the source and the instant of return of this light.

$\omega_d$ is the frequency due to the Doppler effect and intervenes as a plus or a minus, depending on the direction of displacement of the target.

In the case of a continuous displacement, the frequency of the signal received is the algebraic sum of these terms.

As $\omega_d$ is constant, two cases are presented:

$$\omega_1 < \omega_0 \text{ or } \omega_1 > \omega_0$$

Figure 9:
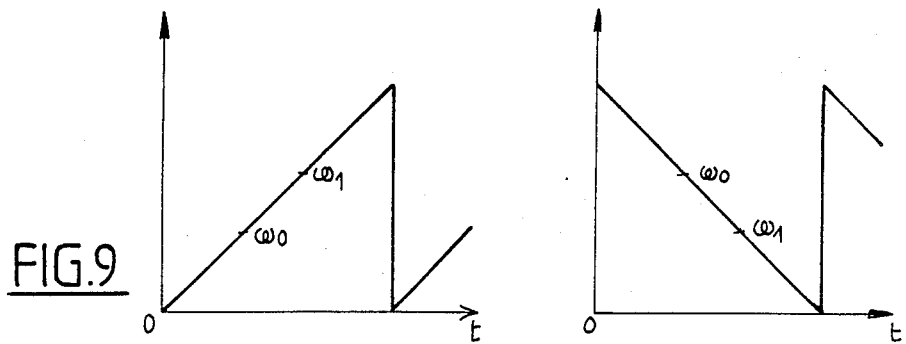
FIG. 9 shows two diagrams corresponding to that of FIG. 8, obtianed respectively with rising and descending slope modulation signals.

These two cases correspond to the inversion of the modulation slope of the ramps generated by the servo-control circuit 30 of the telemeter shown in FIG. 6. They are shown in FIG. 9.

If the difference $\omega_1 - \omega_0$ is called $\omega$, it follows that, for inverse slopes of the same amplitude, the value of $\omega$ remains the same apart from the sign.

If the Doppler shift $\omega_d$ is now taken into account, it is seen that, in the case of rising ramps, it is added to $\omega$, and that, in the case of descending ramps, it is subtracted from $\omega$. Thus a means is available for measuring the velocity of displacement of the target since the frequency difference received between a rising ramp and a descending ramp is equal to twice the Doppler frequency.

Further, the mean value of these two frequencies is representative of the distance between the source and the target.

Figure 10:
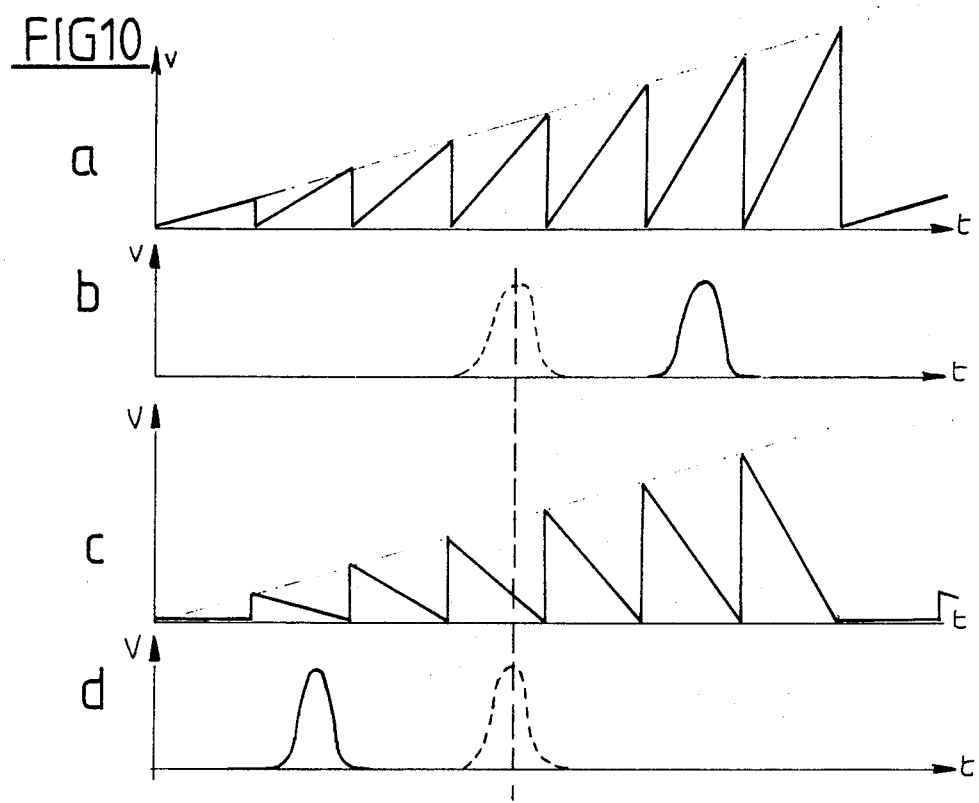
FIG. 10 is a diagram of the signals of the distance between the source and the target obtained at the output of the telemeter of FIG. 6, in response to signals modulated by rising slopes and descending slopes.

The diagram of FIG. 10 shows at (a) a signal modulated by rising modulation ramps corresponding to that produced in the circuit shown in FIG. 6.

At (b), there is shown the response of the filter 34 of this circuit corresponding to the distance between the source and the target which is offset relative to the exact distance owing to the addition of the Doppler effect, the real distance being represented by a signal shown in dotted line.

At (c), there is shown a signal modulated by the descending modulation ramps.

At (d), there is shown the response of the filter 34 to the application of descending modulation ramps, this response corresponding to the distance between the source and the target offset relative to the exact distance owing to the subtraction of the Doppler effect, the real distance being represented by the same signal in dotted line as in (c).

Thus it can be seen that, in order to determine the exact instantaneous distance of a target which moves relative to a source, it is sufficient to have two response signals each resulting from the application to the telemeter of FIG. 6 of a signal modulated by rising ramps and a signal modulated by descending ramps, and to obtain the mean of these two signals.

Figure 11:
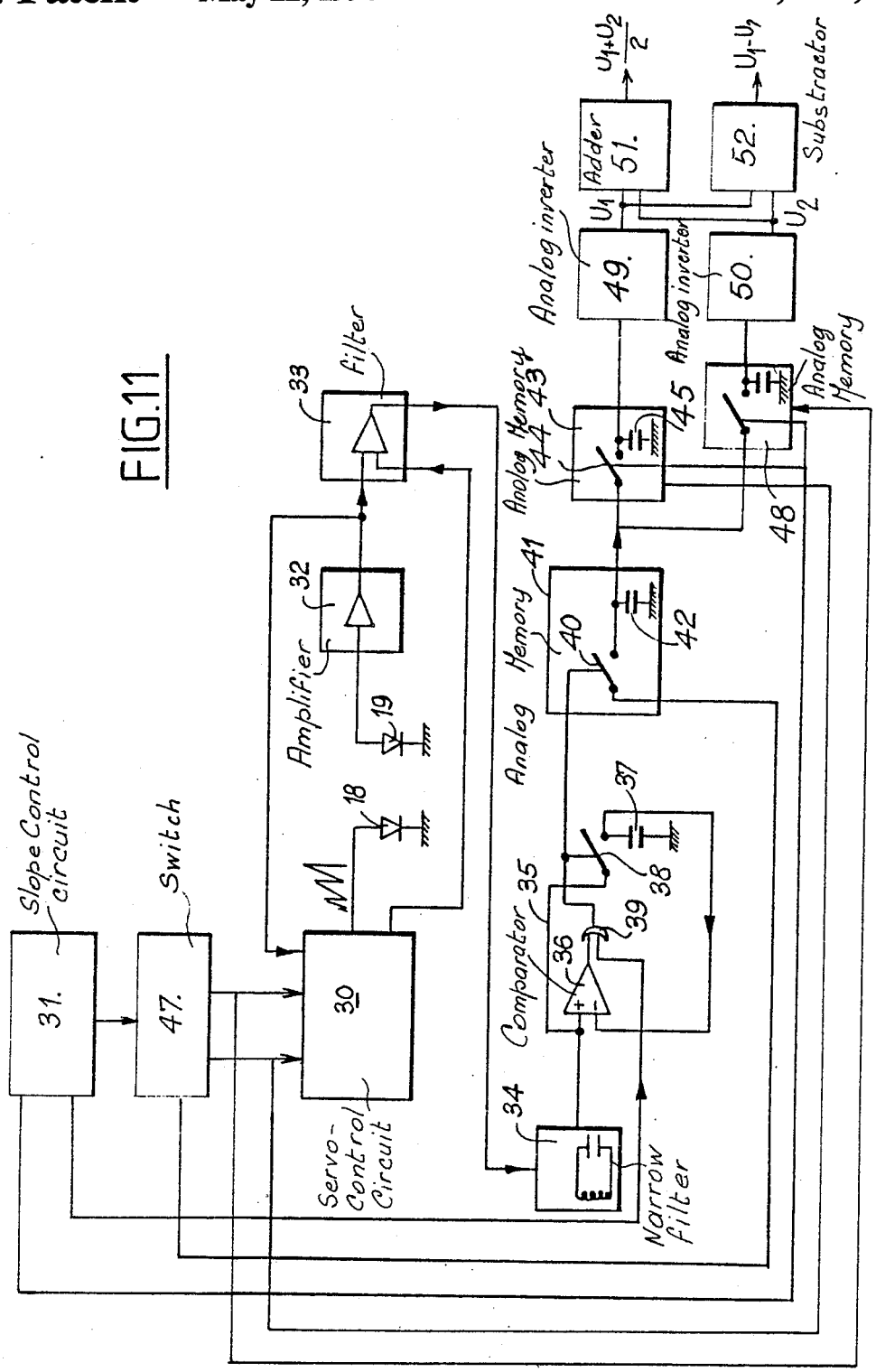
FIG. 11 is a diagram showing a modification of the circuit of FIG. 6 for measuring distances while taking into account displacements of the target with respect to the source.

The telemeter shown in FIG. 11 provides this result.

This telemeter differs from that shown in FIG. 6 in that it comprises, interposed between the slope control circuit 31 and the servo-control circuit 30, a switch 47 constituted for example by a flip-flop adapted to cause for each saw-tooth signal emitted by the slope control circuit 31, the emission by the servo-control circuit 30 of signals modulated by rising ramps and signals modulated by descending ramps The switch 47 comprises two outputs connected, on one hand, to the servo-control circuit 30 and, on the other hand, to the analog memory 43 storing signals of the response of the circuit to the signals modulated by rising ramps and to an additional analog memory 48 storing signals of response to the circuit to signals modulated by descending ramps. The outputs of the memories 43 and 48 are each connected to an analog inverter 49, 50 delivering voltages U1 and U2 which are proportional to the distance. The voltages U1 and U2 are added in an adder 51 associated with a circuit dividing by 2 in order to obtain an output signal corresponding to the real distance between the source and the target.

These same two voltages are applied to a subtractor circuit 52 whose output voltage U1-U2 is proportional to the velocity of displacement of the target.

The circuit shown in FIG. 11 operates in turn on the signals modulated by rising and descending ramps in the same circuit as the circuit shown in FIG. 6.

The denominations of the circuits employed in the construction of the vibrometer shown in FIG. 5 and the telemeter shown in FIG. 6 are given hereinafter by way of non-limiting examples.

---

I - VIBROMETER

| -continued | |
|---|---|
| Diode laser 18, 19 | CQL 16 of RTC |
| Ramp generator 21 | HA 2655 of HARRIS |
| Amplifiers 22 and 23 | HA 5195 of HARRIS |
| Converter 24 | XR 215 of EXAR |
| Sampler-blocker | SHMIC 119 of DATEL |
| Control circuit 26 | SN 74123 of TEXAS INST. |
| Control circuit 27 | SN 7474 of TEXAS INST. |
| II - TELEMETER | |
| Servo-control circuit 30 | HA 2655 of HARRIS |
| Slope control circuit 31 | HA 2655 of HARRIS |
| Amplifiers 32 and 33 | HA 5195 of HARRIS |
| Narrow band filter 34 | HA 5195 of HARRIS |
| Comparator 36 | LM 106 of NATIONAL SEMI-CONDUCTOR |
| Memories 41 and 43 | SHMIC IM. of DATEL |
| Analog inverter 46 | 429 of ANALOG DEVICES |

The circuit shown in FIG. 2 constitutes an evolution of the vibrometer shown in FIG. 5. The elements of this circuit which correspond to those of the circuit shown in FIG. 5 are designated by the same reference numerals. It differs from the circuit of FIG. 5 in that its ramp generator 21 is a generator of successively increasing and decreasing ramps. It further comprises means for discriminating between the distance and velocity data. These discriminating means comprise an additional sampling circuit 43 connected, as the sampler-blocker circuit 25, by one of its inputs to the output of the frequency-voltage converter 24 and by its control input to the output of the control circuit 26.

The outputs of the sampler-blocker circuits 25 and 53 are respectively connected to the negative inputs of an adder circuit 54 and a subtractor circuit 55.

The positive input of the adder circuit 54 is connected to the ground while the positive input of the subtractor circuit 5 is connected to the output of the sampler-blocker circuit 25.

The negative input of the adder circuit 54 is moreover connected to the output of the sampler-blocker circuit 53.

A resistor 56 is connected in parallel between the negative input and the output of the adder circuit 54.

The negative input of the subtractor circuit 55 is moreover connected to the output of an accelerator 57 mechanically connected to the source through an integrator circuit 58.

A resistor 59 is connected in parallel between the negative input and the output of the subtractor circuit 55.

The accelerometer 57 is adapted to measure the vibration component of the source in the direction of the measuring beam so as to avoid the effect of these vibrations and effect an improved measurement of the vibrations of the target.

Figure 12:
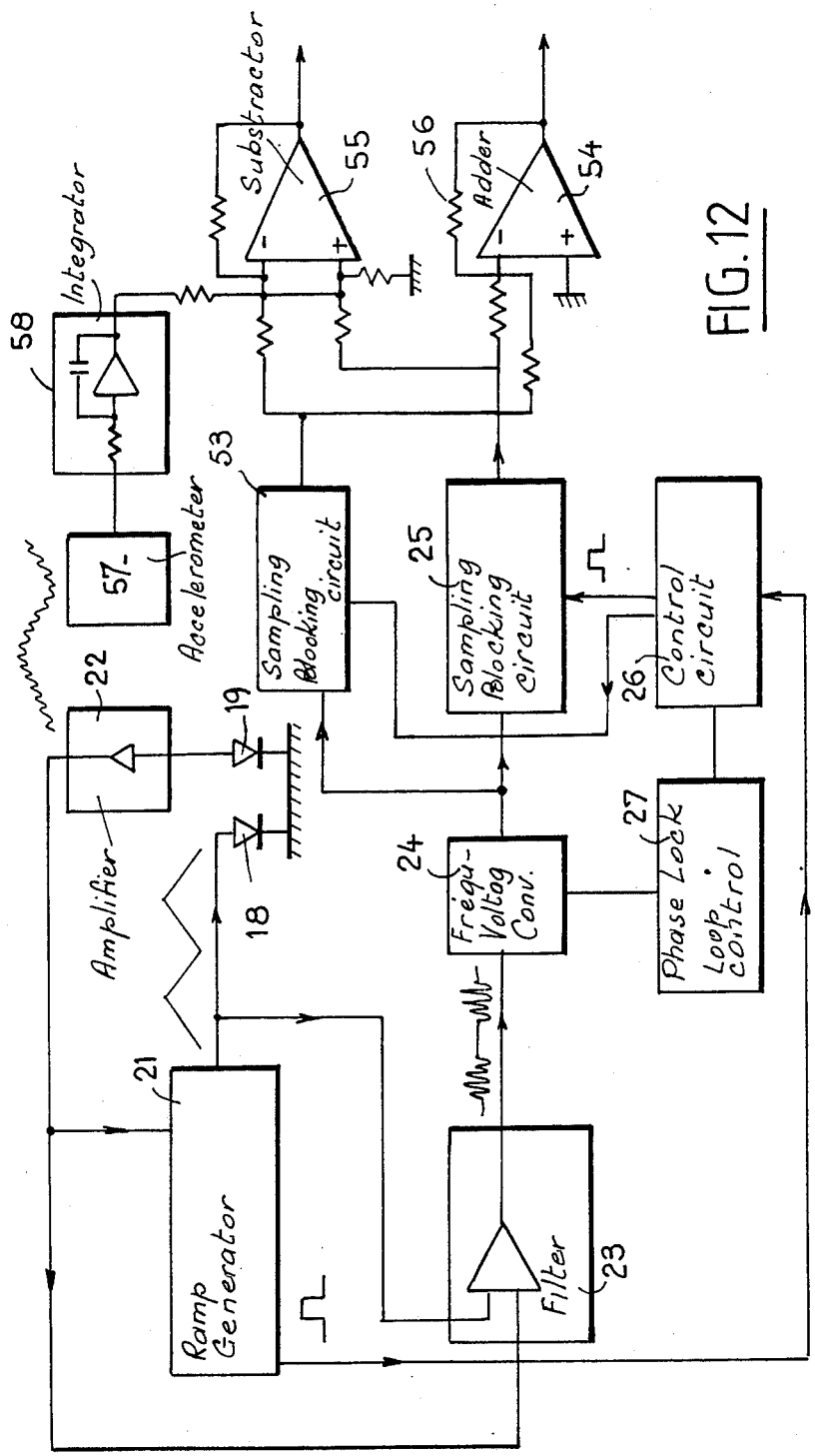
FIG. 12 shows a modification of the circuit of FIG. 5 for measuring the distance between a source and a target and the velocity of the target relative to the source.

The circuit just described with reference to FIG. 12 permits the application to the source 18 of a successively positive and negative slope power modulation.

The signal delivered by the phase locking loop is alternately stored by the sampler-blocker circuits 25 and 53 which store one of the signals modulated by positive slope signals and the other of the signals modulated by negative slope signals.

The sum of the output voltages of the sampler-blocker circuits 25 and 53 accomplished by the adder circuit 54 represents the distance between the source and the target, whereas the difference between these signals accomplished by the subtractor circuit 55 represents the velocity of the target with respect to the source.

The signals coming from the accelerometer 57 are converted by the integrator 58 into velocity signals and subtracted from the velocity signal by application to the subtractor circuit 55.

Thus, the subtractor circuit 55 delivers an output signal which is representative of the velocity of the target from which the velocity component due to the vibrations of the source have been removed.

What is claimed is:

1. Process for optically measuring the distance between a target and a given location, comprising sending toward the target a radiation having a periodically varying wavelength from a monomode coherent light source placed at said location by supplying said source with a signal of variable power, receiving the radiation retroradiated by said target, re-injecting said retroradiated radiation into the cavity of said light source, and receiving on a photodetector placed at the rear of said cavity the beat between said retroradiated radiation and the radiation from said source, the frequency of the beat which is proportional to the delay of the retroradiated wave being representative of the distance between said source and said target, wherein the monomode coherent light source is a laser diode whose property of wavelength variation is a function of the supply power, said signal of variable power being supplied to said diode directly.

2. A device for optically measuring the distance between a target and a given location, said device comprising:
   a monomode coherent light source placed at said location and having a cavity, for sending toward said target a radiation;
   means for periodically varying the wavelength of the light of said radiation from said source;
   a photodetector for detecting the variation in the wavelength between the light from said source and that retroradiated by said target;
   and means for processing an output signal of said photodetector corresponding to a composite optical signal issuing from said cavity and resulting from the re-injection into said cavity of the light retroradiated by said target, the frequency of the output signal of said photodetector being representative of the distance between said source and said target;
   wherein said monomode coherent light source is a laser diode with which a p-i-n photodiode is associated by construction, the wavelength of said laser diode being directly modulated by an electric variable power signal.

3. A device according to claim 2, for in addition measuring the velocity of a mobile target relative to said source by the utilization of the frequency variation due to the Doppler effect of the radiation retroradiated by said mobile target which is superposed on the wavelength variation due to variations in the power supplied to said coherent light source, said means for varying the wavelength of the light of said coherent light source comprising a generator of ramps whose slope is constant and which is adapted to cause a variation of the wavelength of the radiation emitted by said source, and said means for processing the output signal of said photodetector comprising a filter having a first input, a second input and an output, said first input being connected to said photodetector and said second input being connected to an output of said ramp generator so as to deliver at its output signals at the beat frequency received by said photodetector, a frequency-voltage converter connected to said output of said filter and a sampler-blocker circuit for delivering at an output of said sampler-blocker circuit a signal representative of the distance and velocity of said target.

4. A device according to claim 2, wherein said means for varying the wavelength of the light of said coherent light source comprise a power servo-control circuit associated with a slope control circuit adapted to apply to said source a variable slope modulation signal, and said means for receiving on said photodetector said composite signal comprise a narrow band filter and means for processing the output signal of said filter and said variable slope signal for working out the distance between said target and said source by a combination of the frequency response of said filter with the value of the slope of the variable slope signal at the instant of the response of maximum amplitude of said narro band filter.

5. A device according to claim 4, wherein said means for processing the output signal of said narro band filter comprise a voltage maximum search circuit connected to be controlled by said slope control circuit, analog memories for storage and transfer of voltage corresponding to the slope of the control signal at the moment of the response of maximum amplitude of said narrow band filter, and an analog inverter for converting an output signal of a last of said memories into a signal proportional to the distance between said source and said target.

6. A device according to claim 4, further comprising means interposed between said slope control circuit and said power servo-control circuit adapted to control the emission by said servo-control circuit of signals modulated in turn by rising modulation ramps and descending modulation ramps, said narrow band filter reacting in turn to the ramps of different values corresponding to the values of the distance between said target and said source respectively increased and decreased relative to the real distance owing to the presence in the composite signal received on said photodetector of a Doppler frequency signal resulting from the displacement of said target relative to said source, and means for eliminating said Doppler frequency signals and determining the real distance between said source and said target.

7. A device according to claim 6, further comprising means for determining the velocity of said target relative to said source by subtraction of the signals resulting from the modulation by the descending modulation ramps from those resulting from the modulation by the rising modulation ramps.

8. A device according to claim 3, wherein said ramp generator is a generator of ramps having a slope of constant sign.

9. A device according to claim 3, wherein said ramp generator is a generator of ramps which are successively increasing and decreasing and it further comprises an additional sampler-blocker circuit for alternately ensuring with the first-mentioned sampler-blocker circuit storage of signals corresponding to positive and negative slope power modulations delivered by said filter, and means for discriminating between the distance and velocity information comprising an adder circuit and a subtractor circuit, said adder circuit having an input connected to outputs of each of said sampler-blocker circuits, whereas said subtractor circuit has an input connected to an output of one of said sampler-blocker circuits and another input connected to an output of said additional sampler-blocker circuit, said adder circuit having an output which delivers a signal corresponding to the distance of said target from said source, whereas said subtractor circuit has an output which delivers a signal corresponding to the velocity of said target.

10. A device according to claim 9, further comprising an accelerometer mechanically connected to said source and connected to one of the inputs of said subtractor circuit through an integrator for converting into velocity signals signals delivered by said accelerometer under the effect of vibrations of said source, the output signal of said subtractor circuit then corresponding to the velocity of said target with respect to said source from which a vibration component of said source has been removed.

* * * * *